(12) United States Patent
Moore et al.

(10) Patent No.: US 9,129,207 B2
(45) Date of Patent: Sep. 8, 2015

(54) SYSTEMS AND METHODS FOR PRINTING MAPS AND DIRECTIONS

(71) Applicant: Apple Inc., Cupertino, CA (US)

(72) Inventors: Bradford A. Moore, San Francisco, CA (US); Christopher Blumenberg, San Francisco, CA (US); Marcel van Os, San Francisco, CA (US); Albert P. Dul, San Jose, CA (US); Tiffany Jon, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/252,692

(22) Filed: Apr. 14, 2014

(65) Prior Publication Data

US 2014/0313525 A1    Oct. 23, 2014

Related U.S. Application Data

(63) Continuation of application No. 13/487,005, filed on Jun. 1, 2012, now Pat. No. 8,700,331.

(60) Provisional application No. 61/493,072, filed on Jun. 3, 2011.

(51) Int. Cl.
| | |
|---|---|
| G06K 15/02 | (2006.01) |
| G01C 21/36 | (2006.01) |
| G01C 21/00 | (2006.01) |

(Continued)

(52) U.S. Cl.
CPC ............ *G06K 15/1843* (2013.01); *G01C 21/00* (2013.01); *G01C 21/3676* (2013.01); *G09B 29/007* (2013.01); *G09B 29/106* (2013.01)

(58) Field of Classification Search
USPC .......................................................... 701/533
See application file for complete search history.

(56) References Cited

U.S. PATENT DOCUMENTS

| | | | |
|---|---|---|---|
| 4,914,605 A | | 4/1990 | Loughmiller, Jr. et al. |
| 5,897,602 A | * | 4/1999 | Mizuta .......................... 701/540 |

(Continued)

FOREIGN PATENT DOCUMENTS

| | | |
|---|---|---|
| EP | 2672225 | 12/2013 |
| EP | 2672226 | 12/2013 |

(Continued)

OTHER PUBLICATIONS

International Search Report and Written Opinion for PCT/US2012/040556, Feb. 6, 2013 (mailing date), Apple Inc.

(Continued)

*Primary Examiner* — Thomas Tarcza
*Assistant Examiner* — Alex C Dunn
(74) *Attorney, Agent, or Firm* — Adeli LLP

(57) ABSTRACT

This is directed to systems, methods, and computer-readable media for printing maps and directions. In response to receiving an instruction to print directions, a device can define a layout optimized to show the route to travel, along with distinct steps that correspond to the route. The layout can include a map overview showing the entire route, with callouts identifying each step on the route. The layout can also include listings of individual steps, where each listing includes a reference number referring back to a callout and a description of the step. Each listings can also include a map tile showing a detailed view of the step corresponding to the listing. The map overview and the listings can be disposed, for example, in different columns of a landscape view.

20 Claims, 14 Drawing Sheets

(51) Int. Cl.
  *G09B 29/00* (2006.01)
  *G09B 29/10* (2006.01)

(56) References Cited

U.S. PATENT DOCUMENTS

| | | | |
|---|---|---|---|
| 6,202,026 B1* | 3/2001 | Nimura et al. | 701/455 |
| 6,321,158 B1 | 11/2001 | DeLorme et al. | |
| 6,381,534 B2* | 4/2002 | Takayama et al. | 701/465 |
| 7,379,811 B2* | 5/2008 | Rasmussen et al. | 701/532 |
| 7,542,882 B2* | 6/2009 | Agrawala et al. | 703/2 |
| 7,729,854 B2 | 6/2010 | Muramatsu | |
| 8,020,104 B2 | 9/2011 | Robarts et al. | |
| 8,281,246 B2* | 10/2012 | Xiao et al. | 715/738 |
| 8,355,862 B2* | 1/2013 | Matas et al. | 701/408 |
| 8,464,182 B2 | 6/2013 | Blumenberg et al. | |
| 8,606,516 B2 | 12/2013 | Vertelney et al. | |
| 8,607,167 B2 | 12/2013 | Matas et al. | |
| 8,639,654 B2 | 1/2014 | Vervaet et al. | |
| 8,700,331 B2 | 4/2014 | Moore et al. | |
| 2001/0020211 A1* | 9/2001 | Takayama et al. | 701/200 |
| 2002/0059296 A1 | 5/2002 | Hayashi et al. | |
| 2002/0103599 A1 | 8/2002 | Sugiyama et al. | |
| 2006/0004680 A1* | 1/2006 | Robarts et al. | 706/12 |
| 2006/0129973 A1* | 6/2006 | Newcorn et al. | 717/106 |
| 2007/0066343 A1* | 3/2007 | Silverbrook et al. | 455/550.1 |
| 2007/0088897 A1 | 4/2007 | Wailes et al. | |
| 2007/0208502 A1* | 9/2007 | Sakamoto et al. | 701/205 |
| 2008/0037730 A1 | 2/2008 | Cubillo | |
| 2008/0059061 A1 | 3/2008 | Lee | |
| 2008/0082903 A1* | 4/2008 | McCurdy et al. | 715/200 |
| 2008/0147314 A1* | 6/2008 | Cubillo | 701/207 |
| 2009/0319168 A1 | 12/2009 | Sugimoto | |
| 2012/0120099 A1* | 5/2012 | Ishizuka | 345/620 |
| 2012/0265758 A1* | 10/2012 | Han et al. | 707/737 |

FOREIGN PATENT DOCUMENTS

| | | |
|---|---|---|
| EP | 2715284 | 4/2014 |
| JP | 2007-121666 | 5/2007 |
| JP | 2009-204807 | 9/2009 |
| JP | 2010-003007 | 1/2010 |
| WO | WO 2011/146141 | 11/2011 |
| WO | WO 2012/034581 | 3/2012 |
| WO | WO 2012/167154 | 12/2012 |
| WO | WO 2013/184348 | 12/2013 |
| WO | WO 2013/184444 | 12/2013 |
| WO | WO 2013/184449 | 12/2013 |

OTHER PUBLICATIONS

International Preliminary Report on Patentability for PCT/US2012/040556, Dec. 19, 2013 (mailing date), Apple Inc.

Portions of prosecution history of EP1278146.7, Jan. 13, 2014 (mailing date), Apple Inc.

Author Unknown, "Android 2.3.4 User's Guide", May 20, 2011, pp. 1-384, Google, Inc.

Author Unknown, "GARMIN. nüví 1100/1200/1300/1400 series owner's manual," Jan. 2011, 72 pages, Garmin Corporation, No. 68, Jangshu 2nd Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

Author Unknown, "'Touch & Go' Owner's Manual," Jul. 2011, 218 pages, Toyota, United Kingdom.

Ruhs, Chris, "My Favorite Android Apps: Maps," Jun. 24, 2011, 1 page, available at http://www.youtube.com/watch?v=v2aRkLkLT3s.

Updated portions of prosecution history of EP12728146.7, Jul. 17, 2014 (mailing date), Apple Inc.

* cited by examiner

SYSTEMS AND METHODS FOR PRINTING MAPS AND DIRECTIONS

CROSS-REFERENCE TO A RELATE APPLICATION

This application is a continuation of U.S. patent application No. 13/487,005, filed on Jun. 1, 2012, now issued as U.S. Pat. No. 8,700,331. U.S. patent application No. 13/487,005 claims the benefit of U.S. Provisional Patent Application No. 61/493,072, filed Jun. 3, 2011. U.S. patent application No. 13/487,005, now issued as U.S. Pat. No. 8,700,331, and U.S. Provisional Patent Application No. 61/493,072 are incorporated herein by reference.

BACKGROUND

There are many different times when people must navigate to a particular location. For example, a driver of a vehicle may need to navigate from a starting point to a destination. As another example, a pedestrian may need directions to reach a particular point of interest or to meet a friend. A person can use different approaches to get the directions needed to reach a particular destination. For example, a person may look at a map as the user is moving to determine which roads to take, when to turn, how far to go on each road, or combinations of these. If the person cannot look at a map while traveling (e.g., the person is driving, or the person cannot take the map with him), the person can instead look at a map before departing to plot a route and write down turns or other indications corresponding to the route on a piece of paper that the person can take with them for reference.

In some cases, electronic devices may be available to plot a course to a particular location. For example, a satellite navigation system, or a device having access to a mapping application or service (e.g., a device having circuitry for connecting to the Internet) can be provided with starting and ending locations. The device can then define a path between the locations, which can be presented to the user of the device. In some cases, the device can determine its current location in real time to provide turn-by-turn directions from the current location to a destination. Electronic devices can therefore provide a simpler and easier approach for a person to get directions.

These devices, however, may not always be available, or may sometimes not be able to access a mapping system (e.g., a device may not be in cellular range to access the Internet). To ensure that directions are nevertheless available, a user of the device can direct the device to print the directions generated by the device. The resulting printout can include a listing of turns, a map overview, and notes that a user may have wished to include in the printout. Printouts provided by existing devices, however, are often cluttered or poorly laid out, and can be confusing. The pagination of many printouts often separate the graphical representation of the route from the list of turn-by-turn directions, as shown for example, in FIG. 1. FIG. 1 shows two pages, one showing the map, and the other showing the turn-by-turn directions

SUMMARY

This is directed to systems, methods, and computer-readable media for printing maps and directions.

In response to receiving an instruction from a user to print directions (e.g., an instruction received from a mapping application provided on a mobile device), a device can define a layout optimized for directions. The layout can include an overview of the entire route corresponding to the directions, as well as listings of each step of the directions to provide turn-by-turn instructions. The map overview can include callouts that correspond to each step of the directions.

In some cases, the layout can be optimized for landscape-oriented paper. A first column of the layout can include a map overview of the entire route. The route may be highlighted on the map, and may include several callouts. The callouts may be positioned and sequentially numbered to correspond to the different steps of the directions. A second column of the layout can include listings of steps of the directions. The listings can be displayed sequentially, and each include information referencing a callout (e.g., a step number), a detailed map tile showing the particular step, and a description.

If the route includes too many directions to fit on a single page, the layout can include several pages, where the map overview remains in the first column of every page, and the specific listings change in the second column of each page. In some cases, the electronic device can select the number of pages used to print out the directions such that similar numbers of listings are displayed on each page (e.g., to provide a uniform and aesthetically pleasing printout).

In some embodiments, the map overview on each page can focus on the particular steps printed on each page. Certain portions of a route (e.g., the beginning and end) may have interesting or more difficult steps than other steps of the route. Thus, when the printed map is laid out, the map overview may only show the callouts corresponding to steps that are listed on the page, and not show the other callouts.

In some cases, a device-defined dedicated layout can be used to show points of interest on a map. A first column of a layout can be used to display a map overview in which different callouts identify points of interest. A second column of the layout can include listings providing information about each of the points of interest identified in the callouts. In some cases, each listing can include a reference to a callout, a map tile, and a description. The points of interest can correspond, for example, to search results of user-provided search criteria.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to systems, methods, and computer-readable media for printing maps and directions. In particular, this is directed to defining printing layouts for directions in a manner that is easily read and is aesthetically pleasing. In many situations, a person may wish for printed out directions for guidance to a particular destination. To create such printouts, a person must first get directions using an electronic device having appropriate capabilities.

Figure 1:
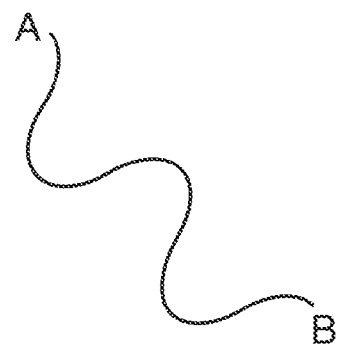
FIG. 1 is a prior art representation of printed navigation directions.
Figure 2:
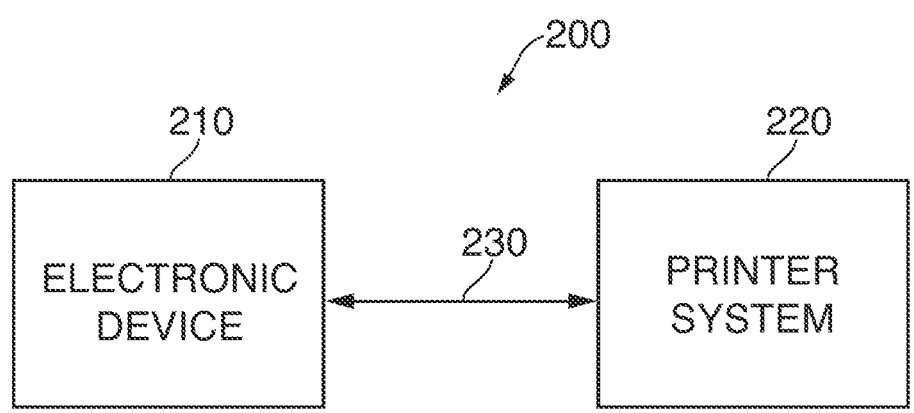
FIG. 2 is a schematic view of an illustrative device and printer system in accordance with some embodiments of the invention.
Figure 12:
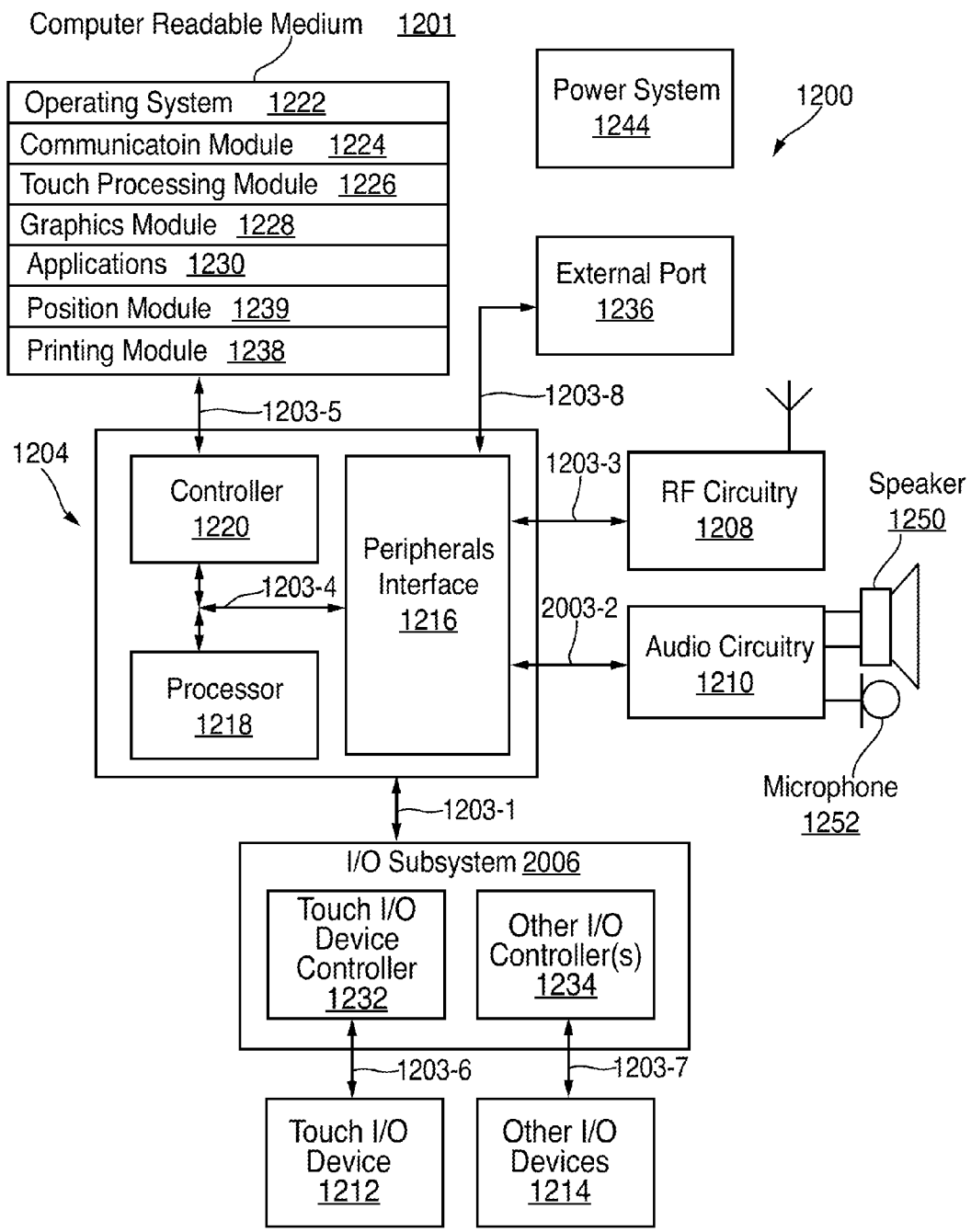
FIG. 12 is a block diagram of an illustrative system for providing printing layouts in accordance with some embodiments of the invention.

FIG. 2 is a schematic view of an illustrative device and printer system in accordance with some embodiments of the invention. System 200 can include device 210 and printer system 220. Device 210 can include any suitable electronic device including, for example, an electronic device having some or all of the features of system 1200 (FIG. 12). For example, electronic device 100 can include a media player such as an iPod® or an iPad® available by Apple Inc., of Cupertino, Calif., a cellular telephone, a personal e-mail or messaging, an iPhone® available from Apple Inc., pocket-sized personal computers, personal digital assistants (PDAs), a laptop computer, a music recorder, a video recorder, a gaming device, a camera, radios, medical equipment, and any other electronic device having a display on which directions can be provided.

Using electronic device 210, a user can request and retrieve directions for navigating to a particular destination. For example, a user can provide a destination using an input interface of the device (e.g., enter an address or coordinates). In some cases, a user can also provide a starting location, though the current position of the device (e.g., as determined from the positioning circuitry) can be used. Once the electronic device has received starting and ending locations, the device can determine directions for navigating from the starting location to the ending location using an appropriate algorithm. For example, the electronic device can define a path between the starting and ending locations based on a network of paths each having particular characteristics or attributes.

As another example, the electronic device can make use of a remote service for generating navigation directions. In particular, the electronic device can transmit coordinates corresponding to the starting and ending locations to a remote source (e.g., using communications circuitry operative to connect to the internet). The remote source can then, using a database of routes and maps, determine a particular path or route from the starting location to the ending location. Directions corresponding to the particular route can be transmitted to the device so that they may be provided to the user. In some cases, the remote source can instead or in addition transmit map tiles that correspond to the particular route for display by the device.

Once a user has retrieved directions on the device, the user may wish to print out the directions so that they may be available even when the device is not available, or even if the device cannot retrieve map tiles corresponding to the directions (e.g., if no network providing a connection to a remote source is available). To do so, the user can direct the electronic device to print the directions on a tangible medium, such as paper, using a printer system.

Printer system 220 can include any suitable device or apparatus operative to construct a physical representation of electronic information (e.g., electronic data corresponding to a map) that the user can use outside of the electronic device. In particular, printer system 220 can include, for example, a laser printer, inkjet printer, thermal printer, dot matrix printer, plotter, facsimile machine, copying machine, or combinations of these. Printer system 220 can provide an output in one or more colors including, for example, a monochromic output or an output combining ink of several colors (e.g., cyan, magenta, yellow and black ink). The output can be provided on any suitable base or medium including, for example, paper of one or more colors, wood, plastic, metal, or any other surface on which ink or color can be overlaid. In some embodiments, the output of printer system 220 can be overlaid on previous outputs to form a three dimensional object (e.g., distinct ink layers of the printer form overlaid layers of a three dimensional object).

Electronic device 210 can provide the information to print to the printer system using any suitable approach. In some embodiments, communications path 230 can be established between electronic device 210 and printer system 220. Communications path 230 can include any suitable wired or wireless communications path (or combinations of these), and can transfer data encoded using any suitable protocol. In some embodiments, communications path 230 can include circuitry for encoding, decoding, or modifying the information transmitted between the electronic device and the printer system.

Communications path 230 can connect to each of device 210 and printer system 220 using any suitable interface or connector. For example, communications path 230 can include a cable having connectors (e.g., USB connectors or Ethernet connectors) that connect to counterpart connector ports in each of the device and printer system. As another example, electronic device 210 and printer system 220 can include communications circuitry for connecting to a communications network supporting the communications path such as, for example, communications circuitry supporting Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination of these.

Figure 3:
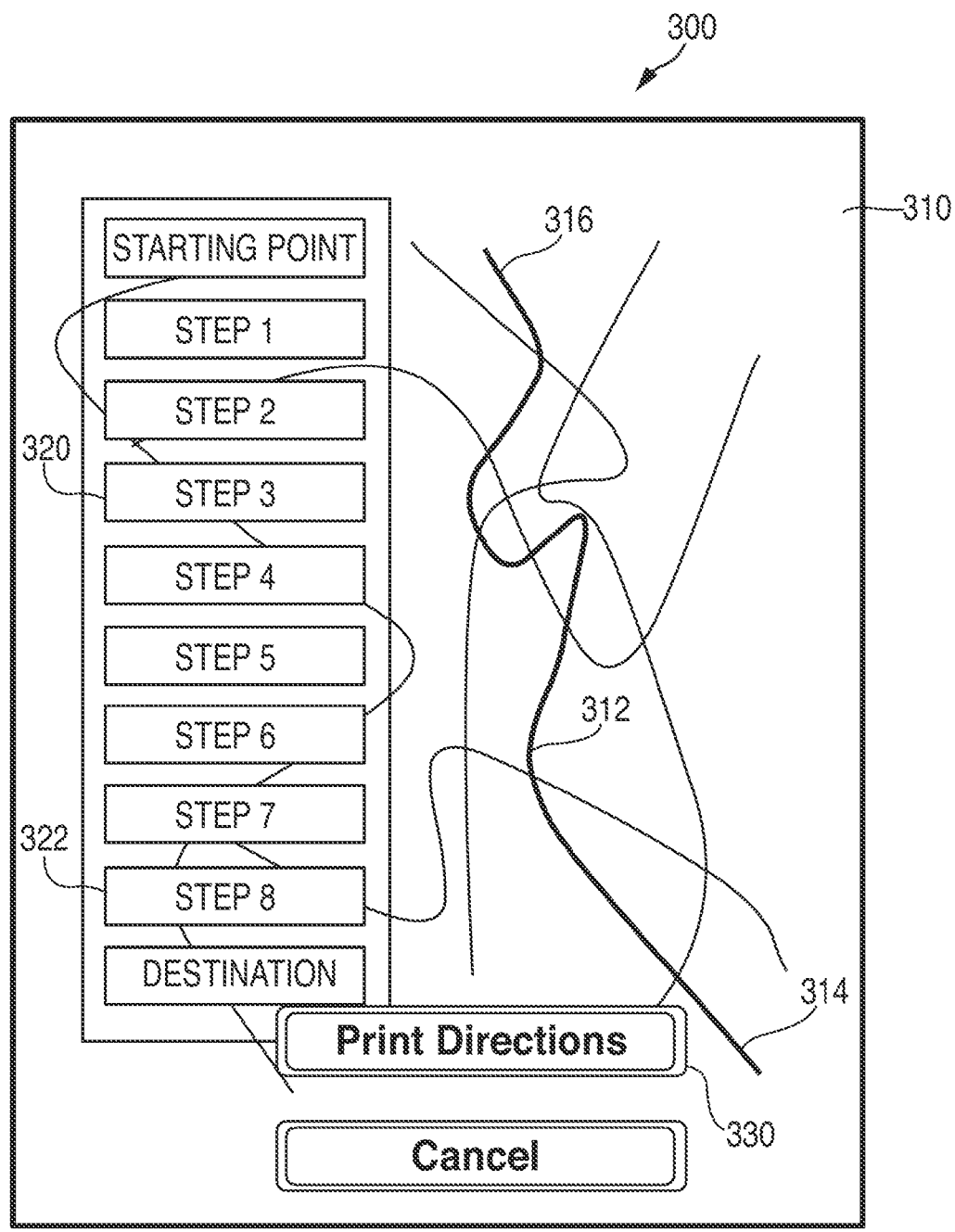
FIG. 3 is a schematic view of an illustrative printing interface provided by a mapping application in accordance with some embodiments of the invention.

The electronic device can provide any suitable interface for printing directions. In some cases, the interface can in part be provided by an application or remote service used to generate the directions. For example, a mapping application on a mobile device can include an option for printing directions generated by the application. FIG. 3 is a schematic view of an illustrative printing interface provided by a mapping application in accordance with some embodiments of the invention. Display 300 can include map 310 depicting a particular region provided by a mapping application. Map 310 can include path 312 indicating a manner for a user to navigate from starting point 314 to destination 316. In addition, display 300 can include listing 320 of steps 322 or directions for guiding the user along path 312.

Because a user may not be able to bring the device providing display 300 with him as he follows path 312, the user may wish to print the directions for reference. Display 300 can provide print option 330 in response to any suitable interaction with the device. In response to receiving a user selection of print option 330, the device can transmit the directions and map to a printer.

To ensure that the directions are printed out in an aesthetically pleasing and useful manner, the electronic device can automatically define a layout for the printed directions that differs from the layout of the map and directions shown in display 300. For example, in response to determining that a print instruction was received from a map application, the electronic device can transmit the content to be printed to the printer system using a pre-defined layout associated with the map application. Different features of the layout will be discussed in more detail below.

Figure 4:
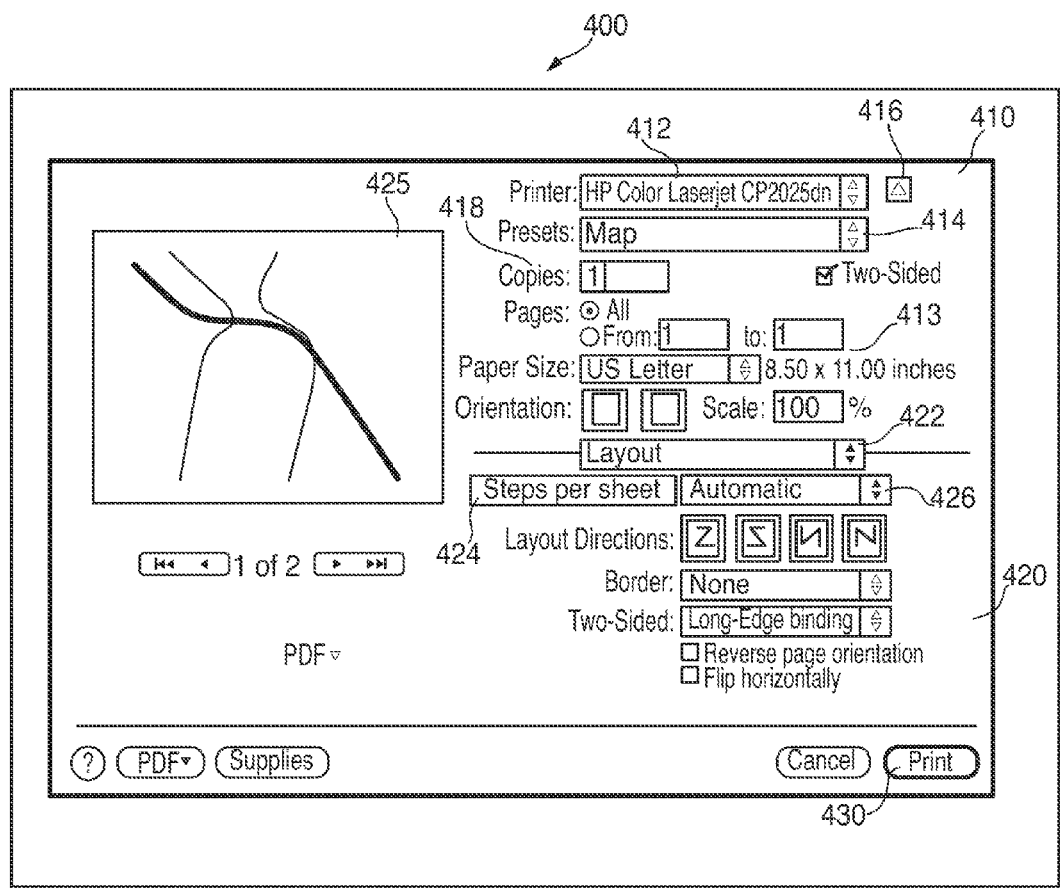
FIG. 4 is a schematic view of an illustrative display for defining print options in accordance with some embodiments of the invention.

In some cases, an electronic device can generate a map and directions using an application other than a map application. For example, a device can display a map in a web browser, where the map and corresponding directions are retrieved from an appropriate web server. A user can direct the device to print the directions with an appropriate layout from a printing interface that includes options relating to printing directions or printing a map. FIG. 4 is a schematic view of an illustrative display for defining print options in accordance with some embodiments of the invention. The electronic device can provide display 400 at any suitable time including, for example, in response to receiving an instruction to print a map or directions. Display 400 can include printing options displayed using any suitable approach. For example, display 400 can include dialog or menu 410 having different options for defining a print request. In some cases, display 400 can instead or in addition provide the print options using other approaches including, for example, as a full display, as part of a menu, in an overlay, or combinations of these.

Menu 410 can include print options for defining any suitable print setting such as, for example, which printer to use, paper orientation, a selection of pages to print, collation, two-sided printing, the document layout (pages per sheet or border), color matching, paper size, paper feed, the use of a cover page, stapling, margin shifts, or combinations of these. In some cases, menu 410 can include one or more options specific to printing a map or directions. The options can be disposed in any suitable manner on menu 410. For example, menu 410 can include printer selection option 412, presets option 414, copies option 418, pages option 419, and option 416 for expanding the available options in region 420. In some cases, menu 410 can display a preview of the content to be printed in preview window 425.

When maps or directions are to be printed, a user can select a "Map" preset in preset option 414. In response to selecting the "Map" preset, the electronic device can generate a layout optimized for printing out a map and directions. In some cases, the user can customize the "Map" preset by selecting corresponding options in region 420 of menu 410. The particular options of region 420 can be related to menu selection option 422, which can include a drop down menu defining several categories of printing sub-options. Among the options of region 420, menu 410 can include option 424 for defining the number of steps or directions to print on each sheet of paper. The user can define a particular number of steps using option 426, or can allow the device to automatically determine an optimal number of steps (e.g., as shown in FIG. 4). Once the user has selected the desired presets and customized the desired options, the user can select print option 430 to direct the device to print the map and directions. The map and directions can be provided, as part of a pre-defined layout, to a printing system for printing.

Figure 5:
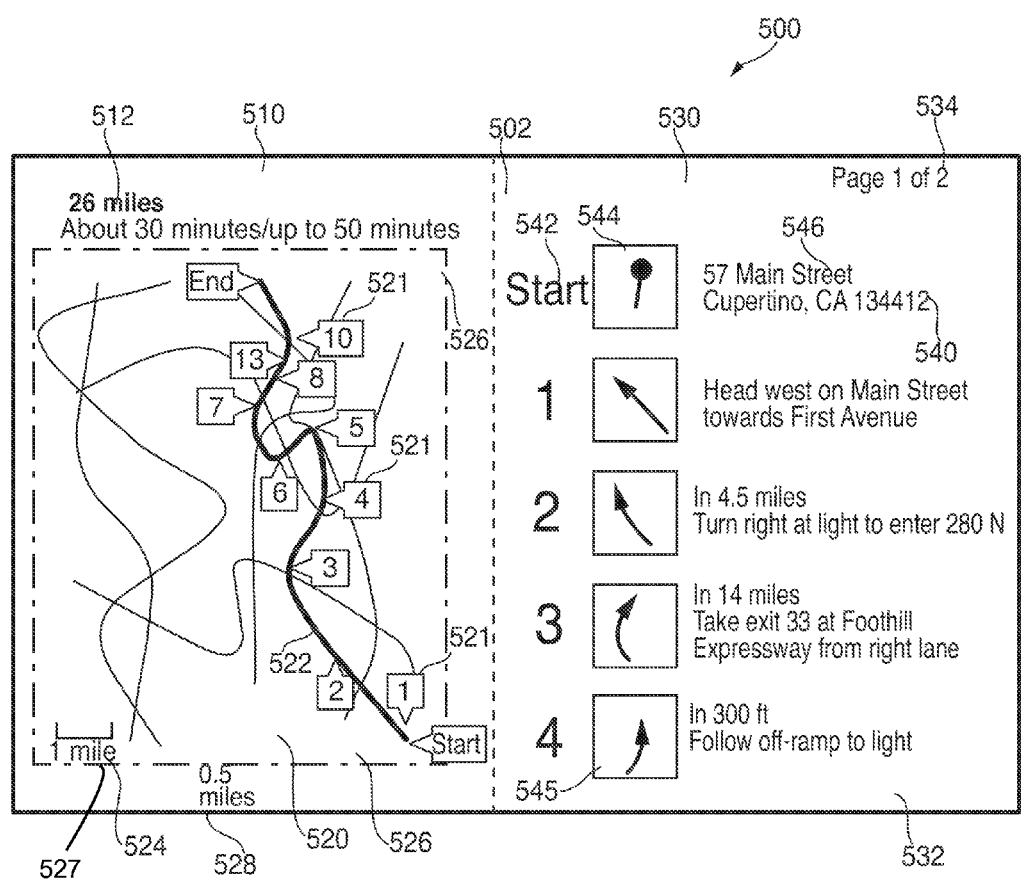
FIG. 5 is a schematic view of an illustrative printing layout of directions in accordance with some embodiments of the invention.

Any suitable information related to directions requested by a user can be printed as part of the pre-defined layout. FIG. 5 is a schematic view of an illustrative printing layout of directions in accordance with some embodiments of the invention. Page 500 can include different information for navigating to a destination. In particular, page 500 can include region 510 providing an overview of a route suggested to a user, and region 530 describing the steps required to follow the route. Regions 510 and 530 can be laid out in different columns such that centerline 502 of page 500 separates the regions. In this manner, page 500 can be folded in half along centerline 502 without creasing or obscuring any of the information in either of regions 510 and 530.

Region 510 can include an overview of the route requested by the user. For example, region 510 can include a general description 512 of the route describing the distance and time required for following the route. Region 510 can also include map 520 on which route 522 extends from a starting location to an ending location selected by the user. Map 520 can be provided at any suitable scale. For example, the map tiles can be provided at a scale appropriate to show the entirety of route 522. The specific scale can be displayed, for example as scale 524.

Because scale 524 may only be provided in a small corner of map 520, it may be difficult or cumbersome for a user to constantly refer back to scale 524 when looking at a region of map 520 that is away from scale 524. To provide the user with an additional indication of scale, border 526 of map 520 can be discontinuous in a manner that reflects the scale of map 520. For example, individual dashes 527 or spaces between dashes 527 can be sized in a manner that corresponds to scale 524. In particular, each dash 527 can have a length that matches a gradation of scale 524 (e.g., dash 527 has a length corresponding to 0.5 miles, shown in scale 524). The distribution of dashes 527, as well as the size of the dashes or of the spaces between dashes can change based on the scale used to display map 520. For example, a same length for a dash may correspond to different distances in two different maps displayed at different scales.

The electronic device can select dimensions of the border using any suitable approach. In some cases, the electronic device can initially determine the scale at which map 520 is displayed. The electronic device can also determine the dimensions of map 520 (e.g., the height and width). Based on the dimensions of map 520, the electronic device can determine a range of possible dimensions for individual dashes and spaces. The range can be selected such that an appropriate number of dashes and spaces are displayed on each boundary of map 520, while ensuring that each dash or space is sufficiently short or long to be useful to a user. The electronic device can then select a particular length in the determined range that corresponds to a length of a meaningful scaled distance of map 520 (e.g., the selected length corresponds to 100 feet, 0.5 miles, 10 miles, or 50 miles based on the scale at which map 520 is displayed). In some cases, region 510 can include an indication of the scale of the dashes and/or spaces of border 526 (e.g., indication 528).

Region 530, which can be located opposite region 510 relative to centerline 502, can include listings 532 of steps that a user must follow to navigate from the starting location to the ending location. A step number 542, a map tile 544, and a description 546 can serve to identify each step 540 in listings 532. Step number 542 can correspond to the number in a sequence of steps defining route 522.

Each step can include an instruction corresponding to a turn or road for the user to take. The particular driving instruction (e.g., turn or go straight), the distance to the next instruction, the name of the road, or other information detailing an instruction can be provided in description 546. The information can be formatted such that the same type of information is always provided in the same region of description 546. For example, the description can include, on a first line, a distance to travel, followed on a second line by a direction of travel and a street name.

Because some steps may be complex and difficult to follow using only written directions, region 530 can include map tiles 544 corresponding to each step. Each map tile can include a detailed view of roads in the vicinity of a step, with a highlighted arrow 445 indicating the particular roads for the user to follow.

Each map tile 544 can be provided at any suitable scale or zoom. In particular, the scale for each tile can be selected based on any suitable criteria, such as to ensure that a user has sufficient context to properly follow a direction. Different criteria can be used to determine an appropriate scale for each map tile 544. For example, each tile can be scaled so that such each tile includes sufficient information for the user to make a decision while moving and follow the direction (e.g., display sufficient information to allow the user three to five seconds to make a decision). The decision time can be determined from any suitable factor. For example, the decision time can depend on one or more of the maneuver of the step (e.g., a turn or straight, or how much to turn), the previous maneuver, the next maneuver, the speed at which the user is travelling, was travelling, likely will travel, the mode of travel or transportation for the route (e.g., driving or walking), or combinations of these.

Figure 6:
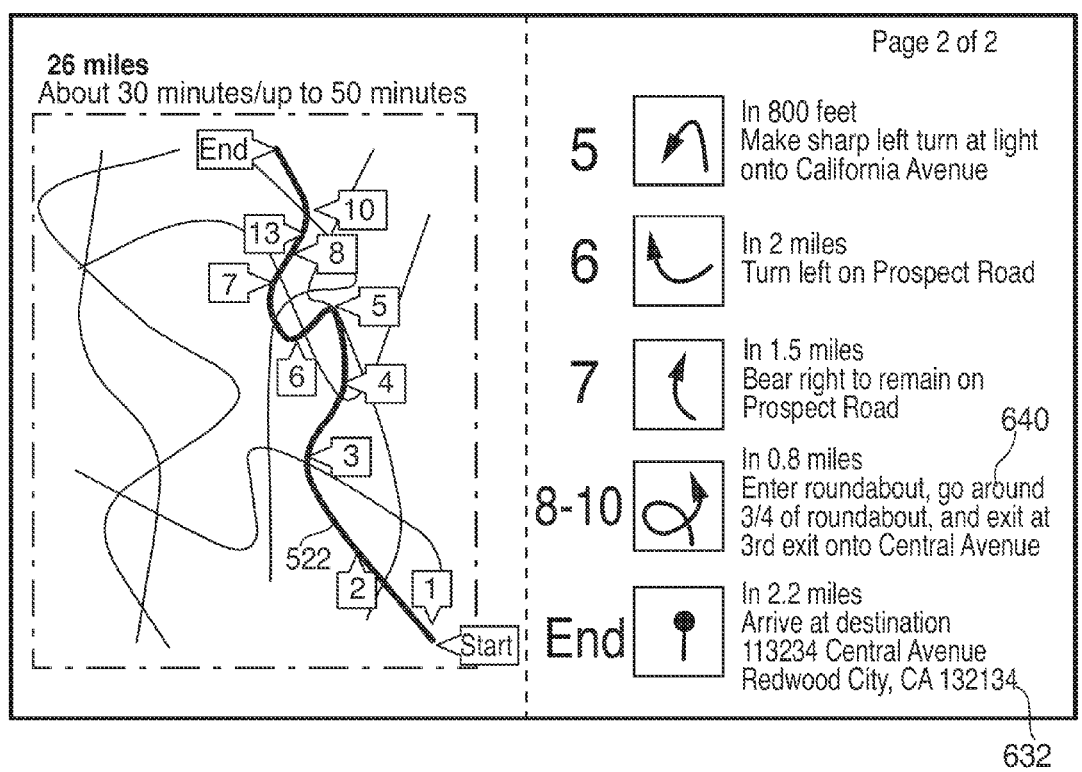
FIG. 6 is a schematic view of another illustrative printing layout of directions in accordance with some embodiments of the invention.

In some cases, several steps may be so close to each other that the decision time required for a particular step may include portions of a previous step or of a next step. In such cases, a single tile may serve to display several steps. For example, as shown in display 600 of FIG. 6, step 640 in listings 632 can include information for three steps (e.g., steps 7, 8, and 9), as well as a tile that shows the route through each of the three steps.

Returning to FIG. 5, region 530 can include any suitable number of steps in listings 532. In some cases, the particular number of steps displayed can be selected to provide a balanced layout on each printed page. For example, it may be desirable for the number of steps displayed on each of several pages to be the same or at most different by one or two steps. The particular page number of a several page printout can be indicated, for example, by page number 534 in a corner of region 530.

Any suitable factor can be used to determine the number of steps to display. In some cases, the electronic device defining the layout for the directions can determine a number of steps to display on each page based on the total number of directions, available paper sizes, and the type of steps (e.g., whether several steps can be combined into a single listing). For example, the electronic device can define a layout in which the number of steps on each page is in the range of 4 to 8, with the final page having at least 3 steps (e.g., to avoid having a final page with only one step). As another example, the electronic device can define a layout such that no page has more than two (or another number) steps more or less than any other pages in the displayed listings.

To determine the specific number of steps to display on each page, the electronic device can first determine the number of steps displayed in the listings of steps. In particular, the device can determine which steps, if any, should be combined in the listings. Once the device has determined the number of steps to display in the listings, the device can divide the number of steps by the desired steps to display per page (e.g., divide by 5 or 6) and determine whether the remainder is less than a minimum threshold. In some cases, the device can divide the number of steps by each of the range of desired steps to find the number of steps that provides a remainder of 0, or a remainder that is closest to the dividing number. Once the device has determined the optimal number of steps per page, the device can define a layout in which each listing of steps has the optimal number of steps per page. In some cases, different pages can have a different number of steps in their respective listings.

In some cases, the desired number of steps to display per page can vary based on the dimensions of paper to print. For example, listings on letter sized paper can preferably have 5 steps, while listings on legal paper can preferably have 7 steps. As another example, listings on A4 paper can preferably have 4 steps, while listings on A3 paper can preferably have 8 steps.

The portion of the route displayed in each map tile 544 can be oriented in any suitable manner. For example, each map tile can be oriented such that north on the displayed map is towards the top of page 500. As another example, each map tile can be oriented such that the user's direction of travel (e.g., as indicated by arrow 545) points towards the top of page 500.

To allow the user to relate each step in listings 532 to map 520, map 520 can include callouts 521 each having a number of a particular step. The map tile 544 corresponding to each step can include a scaled view of a region of map 520 near the corresponding callout 521. As discussed above, the particular scale used for each map tile 544 can differ, though the scale of all of the map tiles may typically be larger than the scale of the corresponding portion of map 520 identified by a callout 521.

In some embodiments, the map overview on each page can focus on the particular steps printed on each page. Certain portions of a route (e.g., the beginning and end) may have interesting or more difficult steps than other steps of the route. Thus, when the printed map is laid out, the map overview may only show the callouts corresponding to steps that are listed on the page, and not show the other callouts. For example, referring to FIGS. 5, if map 520 were to be displayed with focus on the steps in listing 532, only callouts associated with the start step and steps 1-4 would be shown. Similarly, referring to FIG. 6, only callouts associated with steps 5-10 and End would be shown in a listing 532 focused overview map.

In some cases, particular points of interest can be included in the layout along with the route. For example, map 520 can include points of interest along the route. In some cases, the particular points of interest displayed can be selected based on characteristics of the route. For example, callouts or other information identifying gas stations can be displayed when the route exceeds a particular distance or duration (e.g., when it is likely that a user will need to refuel to continue the route). As another example, callouts for coffee shops can be displayed when the user prints directions in the morning, or for a trip expected to be early or late at night.

Figure 7:
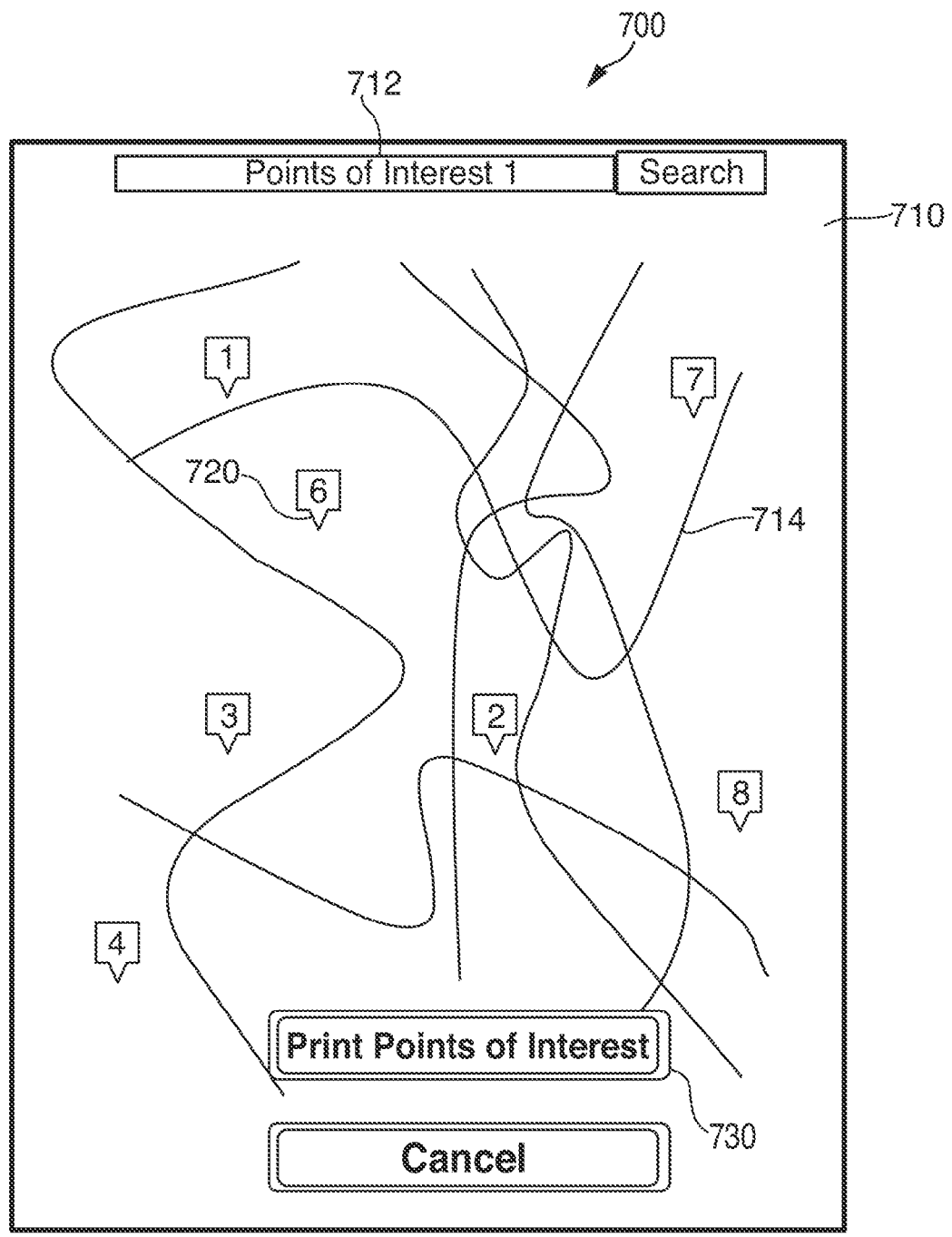
FIG. 7 is a schematic view of an illustrative display of a map on which points of interest are displayed in accordance with some embodiments of the invention.

In addition to printing directions, an electronic device can be used to print out points of interest on a map. For example, a user can use a map application to search for a particular type of point of interest. FIG. 7 is a schematic view of an illustrative display of a map on which points of interest are displayed in accordance with some embodiments of the invention. Display 700 can include map 710 of a particular area, in which points of interest corresponding to a search entered in search bar 712 are displayed. For example, map 710 can include callouts 720 each identifying a particular point of interest. To print out map 710 with the points of interest, the user can provide a print instruction (e.g., select print option 730). In some cases, a map with points of interest near a destination can be printed along with direction to the destination (e.g., automatically or in response to a user instruction).

Figure 8:
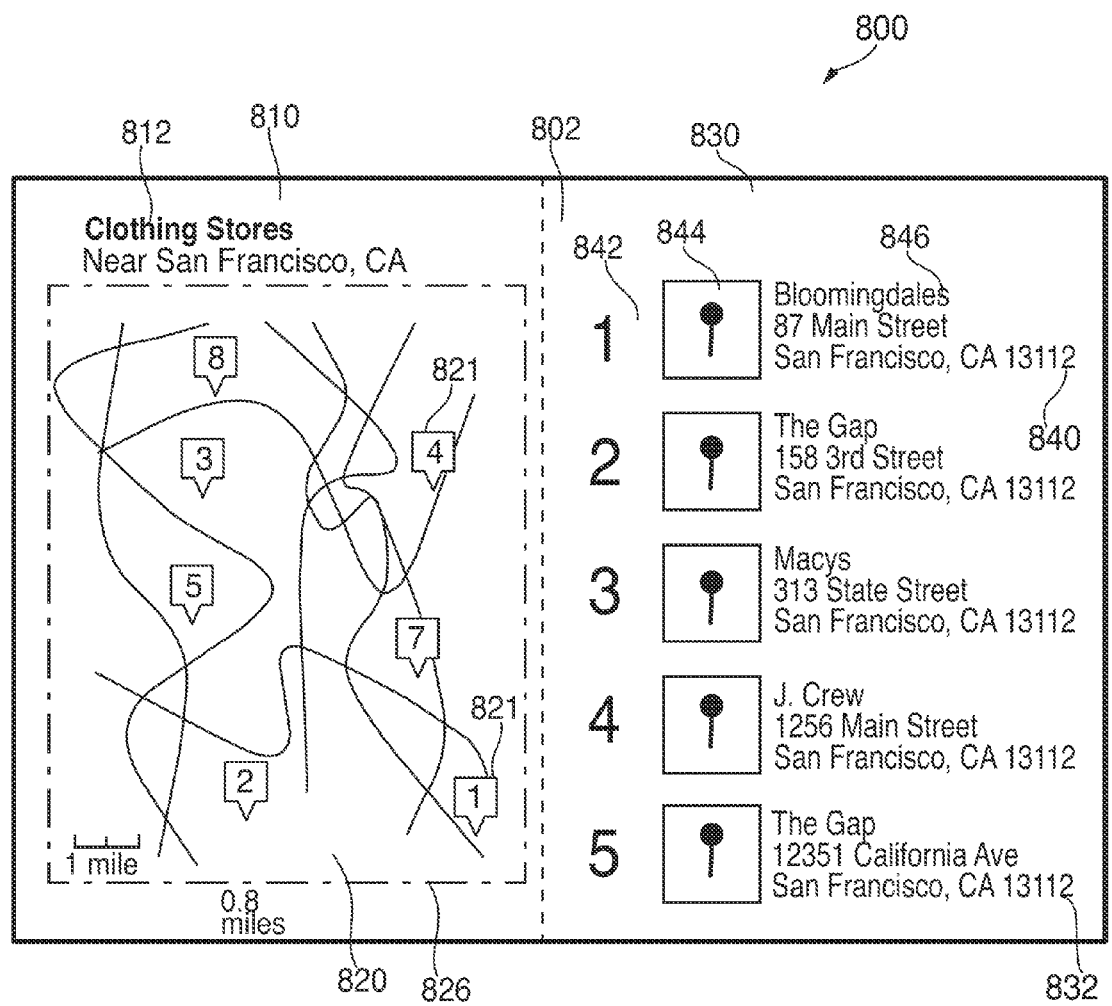
FIG. 8 is a schematic view of an illustrative printing layout on which a map and points of interest are displayed in accordance with some embodiments of the invention.

In response to receiving an instruction to print a map with points of interest, the electronic device can define a layout in which the map and the points of interest are provided. FIG. 8 is a schematic view of an illustrative printing layout on which a map and points of interest are displayed in accordance with some embodiments of the invention. Page 800 can include region 810 and region 830, which can have some or all of the features of corresponding regions of page 500 described above (FIG. 5). Region 810 can include map 820 on which roads and other information is displayed at a particular scale. Map 820 can include callouts 821 disposed in different areas of the map, where each callout corresponds to the location of a particular point of interest (e.g., points of interest corresponding to search terms 812).

In region 830, for example in a column adjacent to a column of region 810, page 800 can include listings 832 of points of interest. Each listing 840 can include identifier 842 corresponding to a particular callout. To assist the user in locating the point of interest of a listing, each listing can include map tile 844 providing a detailed view and position of the point of interest. Additional details describing the point of interest, its address, contact information, hours of operation, website, or other such information can be provided in description 846.

Page 800 can include any suitable number of callouts and listings. In some cases, the number of callouts displayed on map 820 can match the number of listings in listings 832. Alternatively, listings of points of interest can be printed on several pages, where map 820 includes callouts for listings printed on different pages. The points of interest can be provided in any suitable order including, for example, based on distance from a particular location, ratings, popularity, name, availability, relevance, or any other such criteria.

Figure 9:
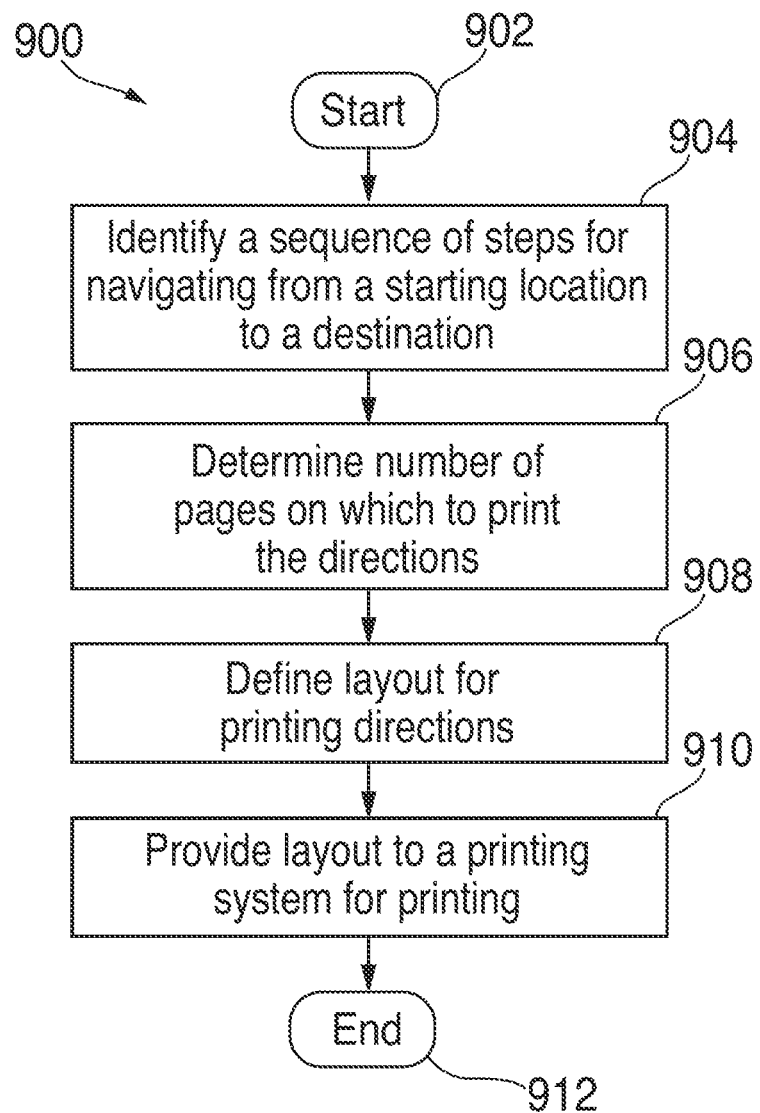
FIG. 9 is a flowchart of an illustrative process for printing directions from a starting position to a destination in accordance with some embodiments of the invention.

FIG. 9 is a flowchart of an illustrative process for printing directions from a starting location to a destination in accordance with some embodiments of the invention. Process 900 can begin at step 902. At step 904, a sequence of steps for navigating from the starting location to the destination can be identified. For example, an electronic device can receive a starting point and a destination, and determine a route for navigating to the destination. At step 906, a number of pages on which to print the sequence of steps can be determined. For example, the device can determine whether the steps will all fit on one page. If not, the device can determine an optimal number of steps to put on each page such that the difference in number of steps printed on each page is no more than two (e.g., to provide a balanced layout on every printed page). At step 908, a layout for printing the directions can be defined. For example, the device can retrieve a map showing an overview of the route from the starting position to the destination, and dispose the map in a first region of each page (e.g., a left column in a landscape view). As another example, the device can define a listing of steps for navigating the route, where each entry in the listing includes a step number, a map tile, and a step description. At step 910, the layout can be provided to a printing system for printing. For example, the electronic device can initiate the printing system to print the layout with the retrieved content. Process 900 can then end at step 912.

Figure 10:
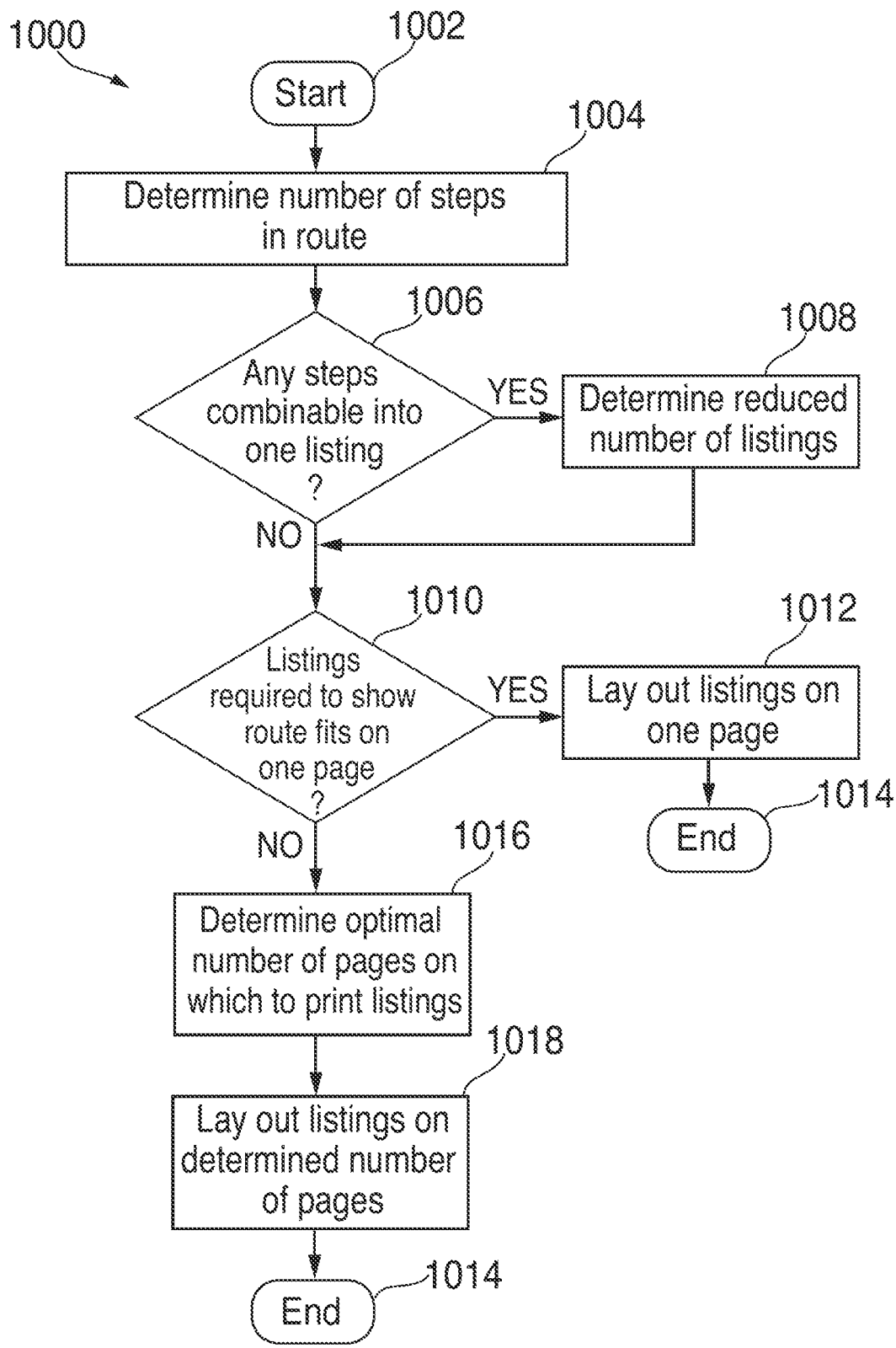
FIG. 10 is a flowchart of an illustrative process for determining the layout of steps on one or more pages in accordance with some embodiments of the invention.

FIG. 10 is a flowchart of an illustrative process for determining the layout of steps on one or more pages in accordance with some embodiments of the invention. Process 1000 can begin at step 1002. At step 1004, the number of steps or directions in a route from a starting location to a final location can be determined. For example, the electronic device can count the number of steps, including the starting location and the final location. At step 1006, the device can determine whether any of the steps can be combined in a single listing. For example, the electronic device can determine whether two or more steps are close to each other (e.g., geographically) so that a single detailed map tile can simultaneously show the two or more steps. If the device determines that some steps can be combined in a single listing, process 1000 can move to step 1008 and determine a reduced number of listings corresponding to the actual number of listings required to display all of the steps of the route. Process 1000 can then move to step 1010.

If, at step 1006, the electronic device instead determines that no steps can be combined into a single listing, process 1000 can move to step 1010. At step 1010, the device can determine whether the listings required to show the route can fit on a single page. For example, the device can determine whether the total number of steps, or the reduced number of listings, is less than a maximum number of listings per page. If the electronic device determines that the listings can fit on a single page, process 1000 can move to step 1012 at which the listings can be laid out on a single page. Process 1000 can then end at step 1014.

If, at step 1010, the electronic device instead determines that the steps cannot fit on a single page, process 1000 can move to step 1016. At step 1016, the optimal number of pages on which to print the listings can be determined. For example, the electronic device can select a number of pages such that each page can include a number of listings that is within a predetermined range (e.g., 4 to 7 listings). In some cases, the electronic device can further select a number of pages such that no page includes substantially more or fewer listings than another page (e.g., no page includes two more listings than any other page). At step 1018, the listings can be laid out on the determined number of pages. For example, the electronic device can dispose listings such that each page includes substantially the same number of listings. Process 1000 can then end at step 1014.

Various different map printing embodiments may be realized using an embodiment according to the principles of the invention. For example, there may be times when the user is not viewing a particular route, but rather is viewing the map. The user may zoom in to various locations on the displayed map and may want to print the map exactly as shown on the screen. Thus, the user is able to print the map at the same zoom level he or she is viewing it on the screen. The printout reverse-geocodes the center of the map to automatically display the location the user is viewing with no additional input from the user.

Although many of the embodiments of the present invention are described herein with respect to personal computing devices, it should be understood that the present invention is not limited to personal computing applications, but is generally applicable to other applications.

Figure 11:
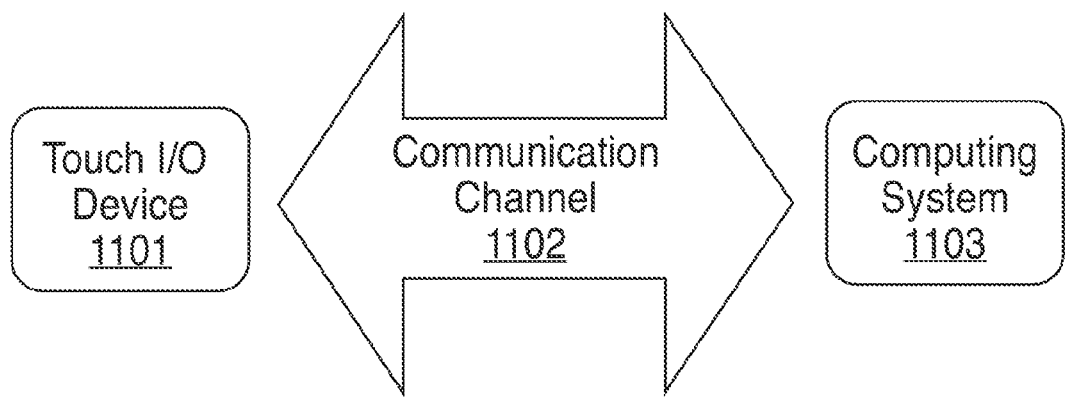
FIG. 11 is a schematic view of an illustrative touch I/O device that can receive touch input for interacting with a computing system via wired or wireless communication channel in accordance with some embodiments of the invention.

In some cases, the device used for described embodiments may include touch I/O device 1101 that can receive touch input for interacting with computing system 1103 (FIG. 11) via wired or wireless communication channel 1102. Touch I/O device 1101 may be used to provide user input to computing system 1103 in lieu of or in combination with other input devices such as a keyboard, mouse, etc. One or more touch I/O devices 1101 may be used for providing user input to computing system 1103. Touch I/O device 1101 may be an integral part of computing system 1103 (e.g., touch screen on a laptop) or may be separate from computing system 1103.

Touch I/O device 1101 may include a touch sensitive panel which is wholly or partially transparent, semitransparent, non-transparent, opaque or any combination thereof. Touch I/O device 1101 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1101 embodied as a touch screen may include a transparent and/or semitransparent touch sensitive panel partially or wholly positioned over at least a portion of a display. According to this embodiment, touch I/O device 1101 functions to display graphical data transmitted from computing system 1103 (and/or another source) and also functions to receive user input. In other embodiments, touch I/O device 1101 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1101 may be configured to detect the location of one or more touches or near touches on device 1101 based on capacitive, resistive, optical, acoustic, inductive, mechanical, chemical measurements, or any phenomena that can be measured with respect to the occurrences of the one or more touches or near touches in proximity to device 1101. Software, hardware, firmware or any combination thereof may be used to process the measurements of the detected touches to identify and track one or more gestures. A gesture may correspond to stationary or non-stationary, single or multiple, touches or near touches on touch I/O device 1101. A gesture may be performed by moving one or more fingers or other objects in a particular manner on touch I/O device 1101 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1103 may drive a display with graphical data to display a graphical user interface (GUI). The GUI may be configured to receive touch input via touch I/O device 1101. Embodied as a touch screen, touch I/O device 1101 may display the GUI. Alternatively, the GUI may be displayed on a display separate from touch I/O device 1101. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1101 which may be associated with the graphical elements of the GUI. In other embodiments, the user may perform gestures at one or more locations that are independent of the locations of graphical elements of the GUI. Gestures performed on touch I/O device 1101 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1103 (e.g., affect a state or mode of a GUI, application, or operating system). Gestures may or may not be performed on touch I/O device 1101 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1102 in response to or based on the touch or near touches on touch I/O device 1101. Feedback may be transmitted optically, mechanically, electrically, olfactory, acoustically, or the like or any combination thereof and in a variable or non-variable manner.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 1200, including combinations of two or more of these types of devices. FIG. 12 is a block diagram of one embodiment of system 1200 that generally includes one or more computer-readable mediums 1201, processing system 1204, Input/Output (I/O) subsystem 1206, radio frequency (RF) circuitry 1208 and audio circuitry 1210. These components may be coupled by one or more communication buses or signal lines 1203.

It should be apparent that the architecture shown in FIG. 12 is only one example architecture of system 1200, and that system 1200 could have more or fewer components than shown, or a different configuration of components. The various components shown in FIG. 12 can be implemented in hardware, software, firmware or any combination thereof, including one or more signal processing and/or application specific integrated circuits.

RF circuitry 1208 is used to send and receive information over a wireless link or network to one or more other devices and includes well-known circuitry for performing this function. RF circuitry 1208 and audio circuitry 1210 are coupled to processing system 1204 via peripherals interface 1216. Interface 1216 includes various known components for establishing and maintaining communication between peripherals and processing system 1204. Audio circuitry 1210 is coupled to audio speaker 1250 and microphone 1252 and includes known circuitry for processing voice signals received from interface 1216 to enable a user to communicate in real-time with other users. In some embodiments, audio circuitry 1210 includes a headphone jack (not shown).

Peripherals interface 1216 couples the input and output peripherals of the system to processor 1218 and computer-readable medium 1201. One or more processors 1218 communicate with one or more computer-readable mediums 1201 via controller 1220. Computer-readable medium 1201 can be any device or medium that can store code and/or data for use by one or more processors 1218. Medium 1201 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1201 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 1218 run various software components stored in medium 1201 to perform various functions for system 1200. In some embodiments, the software components include operating system 1222, communication module (or set of instructions) 1224, touch processing module (or set of instructions) 1226, graphics module (or set of instructions) 1228, one or more applications (or set of instructions) 1230, and printing module [or set of instructions] 1238. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 1201 may store a subset of the modules and data structures identified above. Furthermore, medium 1201 may store additional modules and data structures not described above.

Operating system 1222 includes various procedures, sets of instructions, software components and/or drivers for controlling and managing general system tasks (e.g., memory management, storage device control, power management, etc.) and facilitates communication between various hardware and software components.

Communication module 1224 facilitates communication with other devices over one or more external ports 1236 or via RF circuitry 1208 and includes various software components for handling data received from RF circuitry 1208 and/or external port 1236.

Graphics module 1228 includes various known software components for rendering, animating and displaying graphical objects on a display surface. In embodiments in which touch I/O device 1212 is a touch sensitive display (e.g., touch screen), graphics module 1228 includes components for rendering, displaying, and animating objects on the touch sensitive display.

One or more applications 1230 can include any applications installed on system 1200, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 1226 includes various software components for performing various tasks associated with touch I/O device 1212 including but not limited to receiving and processing touch input received from I/O device 1212 via touch I/O device controller 1232.

Position module 1239 can include various software components for detecting a current position of system 1200. For example, module 1239 may determine the position by interacting with RF circuitry 1208, which may include a GPS receiver, RF triangulation detector or sensor, or any other positioning circuitry configured to determine the geographic or physical location of system 1200. Module 1239 may also be operative to communicate with one or more remote servers or communications networks to determine the geographic or physical location of system 1200, or to retrieve mapping tiles corresponding to a map.

System 1200 may further include printing module 1238 for performing the method/functions as described herein in connection with FIGS. 3-10. Printing module 1238 may at least function to define a printing layout and transmit printing instructions to a printing system. Module 1238 may be embodied as hardware, software, firmware, or any combination thereof. Although module 1238 is shown to reside within medium 1201, all or portions of module 1238 may be embodied within other components within system 1200 or may be wholly embodied as a separate component within system 1200.

I/O subsystem 1206 is coupled to touch I/O device 1212 and one or more other I/O devices 1214 for controlling or performing various functions. Touch I/O device 1212 communicates with processing system 1204 via touch I/O device controller 1232, which includes various components for processing user touch input (e.g., scanning hardware). One or more other input controllers 1234 receives/sends electrical signals from/to other I/O devices 1214. Other I/O devices 1214 may include physical buttons, dials, slider switches, sticks, keyboards, touch pads, additional display screens, or any combination thereof.

If embodied as a touch screen, touch I/O device 1212 displays visual output to the user in a GUI. The visual output may include text, graphics, video, and any combination thereof. Some or all of the visual output may correspond to user-interface objects. Touch I/O device 1212 forms a touch-sensitive surface that accepts touch input from the user. Touch I/O device 1212 and touch screen controller 1232 (along with any associated modules and/or sets of instructions in medium 2001) detects and tracks touches or near touches (and any movement or release of the touch) on touch I/O device 1212 and converts the detected touch input into interaction with graphical objects, such as one or more user-interface objects. In the case in which device 1212 is embodied as a touch screen, the user can directly interact with graphical objects that are displayed on the touch screen. Alternatively, in the case in which device 1212 is embodied as a touch device other than a touch screen (e.g., a touch pad), the user may indirectly interact with graphical objects that are displayed on a separate display screen embodied as I/O device 1214.

Touch I/O device 1212 may be analogous to the multi-touch sensitive surface described in the following U.S. Pat.

No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 1212 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1212 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1200 also includes power system 1244 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1216, one or more processors 1218, and memory controller 1220 may be implemented on a single chip, such as processing system 1204. In some other embodiments, they may be implemented on separate chips.

In some cases, one or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 13:
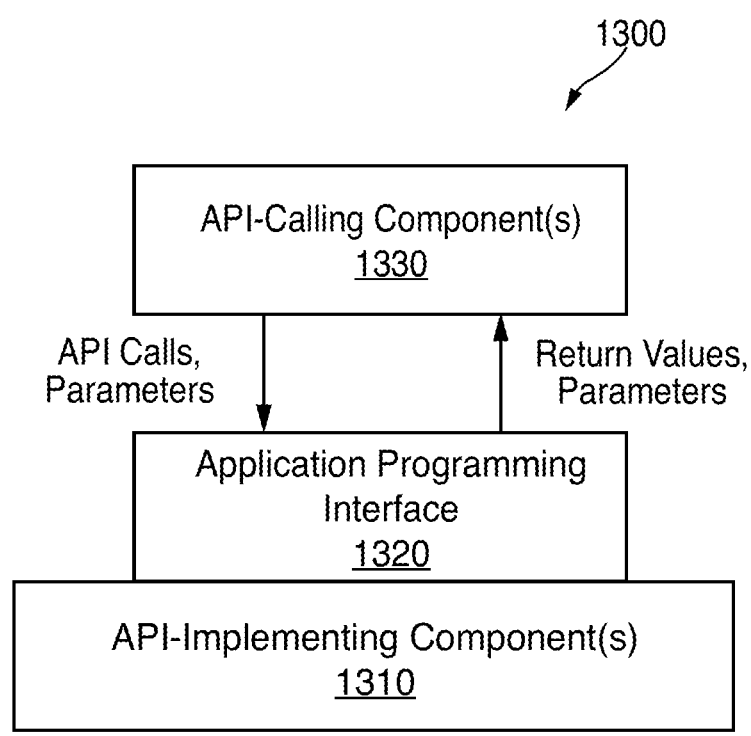
FIG. 13 is a block diagram illustrating an exemplary API architecture in accordance with some embodiments of the invention.

FIG. 13 is a block diagram illustrating an exemplary API architecture, which may be used in some embodiments of the invention. As shown in FIG. 13, the API architecture 1300 includes the API-implementing component 1310 (e.g., an operating system, a library, a device driver, an API, an application program, software or other module) that implements the API 1320. The API 1320 specifies one or more functions, methods, classes, objects, protocols, data structures, formats and/or other features of the API-implementing component that may be used by the API-calling component 1330. The API 1320 can specify at least one calling convention that specifies how a function in the API-implementing component receives parameters from the API-calling component and how the function returns a result to the API-calling component. The API-calling component 1330 (e.g., an operating system, a library, a device driver, an API, an application program, software or other module), makes API calls through the API 1320 to access and use the features of the API-implementing component 1310 that are specified by the API 1320. The API-implementing component 1310 may return a value through the API 1320 to the API-calling component 1330 in response to an API call.

It will be appreciated that the API-implementing component 1310 may include additional functions, methods, classes, data structures, and/or other features that are not specified through the API 1320 and are not available to the API-calling component 1330. It should be understood that the API-calling component 1330 may be on the same system as the API-implementing component 1310 or may be located remotely and accesses the API-implementing component 1310 using the API 1320 over a network. While FIG. 13 illustrates a single API-calling component 1330 interacting with the API 1320, it should be understood that other API-calling components, which may be written in different languages (or the same language) than the API-calling component 1330, may use the API 1320.

The API-implementing component 1310, the API 1320, and the API-calling component 1330 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 14:
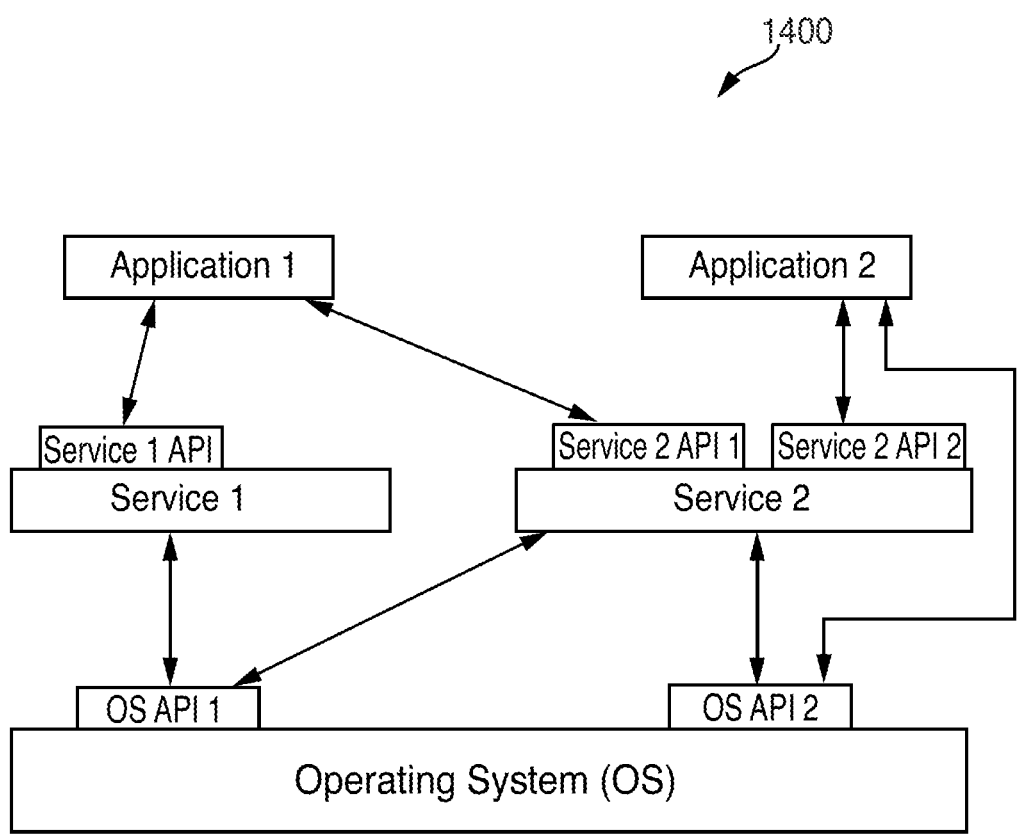
FIG. 14 is a block diagram of an illustrative software stack by which applications can make calls to Services A or B using APIs in accordance with some embodiments of the invention.

In FIG. 14 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. A method for printing a map, the method comprising:
    receiving a map for printing;
    identifying a scale for the map;
    defining a printing layout for the map, wherein the printing layout comprises a discontinuous border around the map and a length of a segment of the discontinuous border indicates the scale of the map; and
    outputting the defined printing layout to an electronic printer system,
    wherein the receiving, identifying, defining, and outputting are performed by an electronic device.

2. The method of claim 1, wherein defining the printing layout further comprises:
    identifying a particular length corresponding to a particular distance on the map based on the scale of the map; and
    defining the discontinuous border such that the length of the segment is the particular length.

3. The method of claim 2, wherein the particular distance is displayed on the map.

4. The method of claim 1, wherein defining the printing layout further comprises:
    determining a height and a width for the map; and
    based on (i) the determined height and width and (ii) the scale for the map, determining the length of the segment.

5. A method for printing a map, the method comprising:
identifying a set of points of interest;
receiving a map for printing along with the set of points of interest;
defining a printing layout comprising:
   a first region comprising the map showing a set of callouts, each callout in the set of callouts corresponding to a point of interest of the set of points of interest; and
   a second region, adjacent to the first region, comprising a set of listings of the callouts, wherein each listing in the set of listings comprises a graphical representation and a textual description of the point of interest corresponding to the callout; and
outputting the defined printing layout to an electronic printer system,
wherein the identifying, receiving, defining, and outputting are performed by an electronic device.

6. The method of claim 5 further comprising:
disposing the first region on a left side of the layout; and
disposing the second region on a right side of the layout.

7. The method of claim 5, wherein each listing of the set of listings further comprises a number corresponding to a number displayed on each callout of the set of callouts.

8. The method of claim 5, wherein identifying the set of points of interest comprises:
receiving a search request from a user; and
identifying search results from the search request as the set of points of interest.

9. The method of claim 5 further comprising displaying a route from a start location to a destination.

10. The method of claim 9, wherein identifying the set of points of interest comprises:
identifying a set of characteristics of the route; and
based on the set of characteristics, identifying the set of points of interest.

11. The method of claim 10, wherein the set of characteristics comprises an expected time of travel for the route.

12. The method of claim 10, wherein the set of characteristics comprises a distance or duration of the route.

13. A non-transitory machine readable medium storing a program which when executed by a set of processing units of an electronic device initiates a printing system to print a map, the program comprising sets of instructions for:
identifying a set of points of interest;
receiving a map for printing along with the set of points of interest; and
defining a printing layout comprising:
   a first region comprising the map showing a set of callouts, each callout in the set of callouts corresponding to a point of interest of the set of points of interest; and
   a second region, adjacent to the first region, comprising a set of listings of the callouts, wherein each listing in the set of listings comprises a graphical representation and a textual description of the point of interest corresponding to the callout; and
outputting the defined printing layout to an electronic printer system.

14. The non-transitory machine readable medium of claim 13, wherein the program further comprises sets of instructions for:
disposing the first region on a left side of the layout; and
disposing the second region on a right side of the layout.

15. The non-transitory machine readable medium of claim 13, wherein each listing of the set of listings further comprises a number corresponding to a number displayed on each callout of the plurality of callouts.

16. The non-transitory machine readable medium of claim 13, wherein the set of instructions for identifying the set of points of interest comprises sets of instructions for:
receiving a search request from a user; and
identifying search results from the search request as the set of points of interest.

17. The non-transitory machine readable medium of claim 13, wherein the program further comprises a set of instructions for displaying a route from a start location to a destination.

18. The non-transitory machine readable medium of claim 17, wherein the set of instructions for identifying the set of points of interest comprises sets of instructions for:
identifying a set of characteristics of the route; and
based on the set of characteristics, identifying the set of points of interest.

19. The non-transitory machine readable medium of claim 18, wherein the set of characteristics comprises an expected time of travel for the route.

20. The non-transitory machine readable medium of claim 18, wherein the set of characteristics comprises a distance or duration of the route.

* * * * *